No. 784,345. PATENTED MAR. 7, 1905.
B. R. PEPPER.
BICYCLE ATTACHMENT.
APPLICATION FILED NOV. 11, 1903.
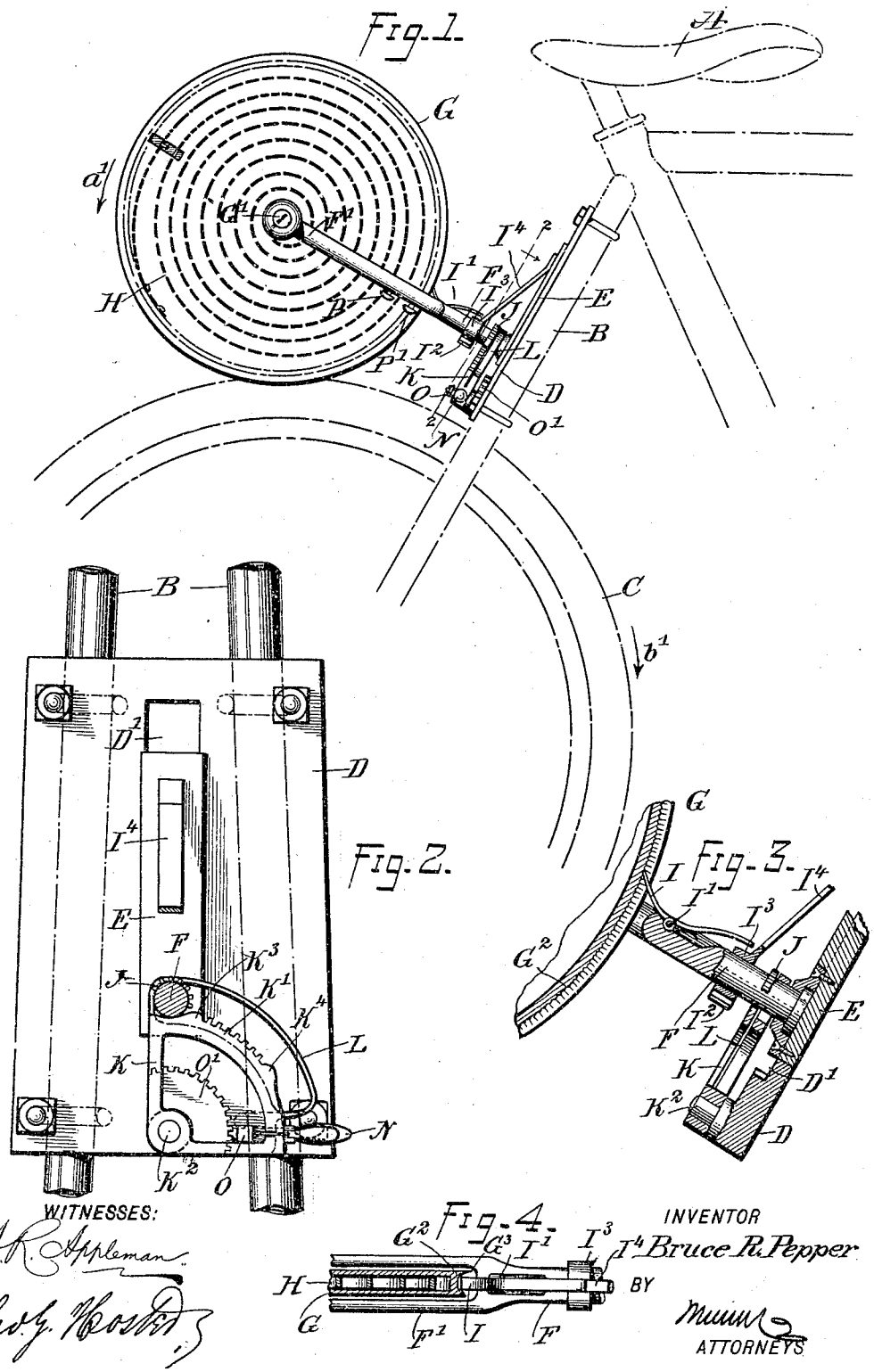
INVENTOR
Bruce R. Pepper No. 784,345.

Patented March 7, 1905.

UNITED STATES PATENT OFFICE.

BRUCE REAVES PEPPER, OF YAZOO CITY, MISSISSIPPI.

BICYCLE ATTACHMENT.

SPECIFICATION forming part of Letters Patent No. 784,345, dated March 7, 1905.

Application filed November 11, 1903. Serial No. 180,714.

*To all whom it may concern:*

Be it known that I, BRUCE REAVES PEPPER, a citizen of the United States, and a resident of Yazoo City, in the county of Yazoo and State of Mississippi, have invented a new and Improved Bicycle Attachment, of which the following is a full, clear, and exact description.

The object of the invention is to provide a new and improved bicycle attachment arranged to store up power on a downgrade for use in propelling the bicycle on a level grade or on an upgrade to render riding as easy as possible.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied. Fig. 2 is an enlarged cross-section of the same on the line 2 2 of Fig 1. Fig. 3 is an enlarged sectional side elevation of the improvement; and Fig. 4 is a plan view of the same, the wheel and its spring being shown in section.

The device as illustrated in the drawings is attached to a bicycle of usual construction, and the device is preferably located below and in the rear of a saddle A to be within convenient reach of the rider. The device is mounted above a rear wheel C on a supporting-plate D, clipped or otherwise secured to the rear fork B of the bicycle, and on the said supporting-plate D is formed an upwardly-disposed guideway D', in which is mounted to move a slide E, in which is journaled one end of a shaft F, projecting rearwardly and formed at its other end into a fork F', carrying the fixed shaft G' of a wheel G, the rim of which is concaved to fit the tire of the rear wheel C, so that when the latter rotates on the bicycle, being propelled forward in the usual manner, then the wheel G is turned in the direction of the arrow $a'$ to wind up a spring H, contained within the wheel and secured at its inner end to the shaft G' and at its outer end to the rim of the wheel, as plainly indicated in Fig. 1. The peripheral face of the rim of the wheel G is provided with corrugations or serrations $G^2$, engaged by a pawl I to prevent the wheel from accidentally turning out of a vertical position and to hold the wheel G against return movement when the spring H is wound up. The pawl I is fulcrumed on a spring I', held on the shaft F (see Fig. 3) and serving to hold the pawl in engagement with the corrugations $G^2$. The rear end of the pawl I is adapted to be engaged by a cam $I^2$, formed on a hub $I^3$, loosely fitting the shaft F and connected by a brace $I^4$ with the slide E, so as to move with the latter.

When the wheel G is in the position shown in Fig. 1 for winding up the spring H, then the pawl I engages the corrugations $G^2$; but when the shaft F is turned for reversing the wheel G then the cam $I^2$ imparts a swinging motion to the pawl I, so as to move the same out of engagement with the corrugations of the rim $G^2$. One side, $G^3$, of the rim of the wheel G is preferably made wider than the opposite side, (see Fig. 4,) so that in making the half-turn the side $G^3$ will strike against the tire, thus insuring proper alinement.

Now in order to turn the shaft F and the wheel G to bring the latter into a reversed position for the spring H to uncoil to rotate the wheel G in the reverse direction and assist in driving the wheel C forward in the direction of the arrow $b'$ the following device is provided: On the shaft F is secured or formed a pinion J, adapted to be engaged by the teeth K' of a segment K, fulcrumed at $K^2$ on the supporting-plate D, so that when a swinging motion is given to the said segment K then the teeth K' rotate the pinion J and the shaft F for the latter to make a complete half-turn, so as to reverse the position of the wheel G relative to the tire of the wheel C.

The segment K at the ends of the teeth K' is provided with cam-faces $K^3$ $K^4$ for engaging the shaft F, so as to lift the same to move the wheel G a short distance upward immediately previous to turning the wheel, so that the concave rim of the wheel G moves out of engagement with the tire of the wheel C to allow convenient turning of the wheel.

A guard-rail L is secured to the segment K, through which extends the shaft F to insure proper meshing of the teeth K' with the pinion J.

It is understood that the pinion J has teeth but one-half around its circumference, as only one-half a turn needs to be given to the shaft F for reversing the position of the wheel G.

Now it is evident that when the wheel G is reversed, with the spring H wound up, it is only necessary for the rider to release the pawl I, so that the force of the spring H in uncoiling causes the wheel G to turn in the reverse direction of the arrow $a'$ to rotate the bicycle-wheel C in the direction of the arrow $b'$, thus assisting in propelling the bicycle on level ground or when going uphill. It is understood that the wheel G is held in engagement with the wheel C when in the position shown in Fig. 1 during the time the bicycle moves down a hill, so that no extra power is required on the part of the rider to wind up the spring H, and when the spring H has been wound up the wheel G is moved out of engagement with the tire of the wheel C, and when it is desired to use the wheel G for propelling purposes, as above described, then a half-turn is given to the wheel G, and the latter is then moved back into engagement with the tire C, after which the pawl I is released to allow the force of the spring H to turn the wheel G for the purpose mentioned.

In order to hold the wheel G in an intermediate or inactive position, the segment K is provided with a handle N within convenient reach of the rider for imparting a swinging motion to the segment K, and on the said handle N is arranged a locking-lever O, adapted to engage a notched segment O', fixed on the supporting-plate D, to allow of giving the segment but a short swinging motion to move the wheel G into an inactive position and hold it there until it is desired to move the wheel back into an active position, either for winding up the spring H or for allowing the same to uncoil, as above described.

On the fork F' of the shaft F are arranged bells P and P', of which one is adapted to be sounded when the spring is wound up and the other is adapted to be sounded when the spring is completely unwound, so that the operator can correspondingly shift the wheel G, as above described, to bring the wheel into an inactive position.

Although I have shown and described the device attached to a bicycle, it is evident that it may be applied to other wheeled vehicles, and instead of a spring-actuated motor, as shown, another motor may be used and arranged for bodily engagement with a rotatable part of the vehicle for actuating the motor to store power and for the motor to drive the rotatable part when reversed.

Having thus described my invention, I claim as new and desire to secure by Letters Patent—

1. A bicycle attachment comprising a wheel, a spring adapted to be wound up by said wheel and arranged to drive the latter, a shaft having a fork in which the wheel is journaled, a pinion on said shaft, a support on the bicycle for said shaft, and a manually-controlled segment engaging the pinion on said shaft for turning the latter.

2. In a device of the character described, a wheel, a spring adapted to be wound up by said wheel and arranged to drive the same, said wheel having corrugations on its outer periphery, a pawl for engaging said corrugations, a shaft having a fork in which the wheel is journaled, a support on the bicycle in which support the shaft is rotatable, and an eccentric for automatically controlling said pawl when said shaft is rotated.

3. A bicycle attachment comprising a motor-wheel adapted to be brought into engagement with the rear wheel of the bicycle, a spring within said motor-wheel adapted to be wound up by the same and arranged to drive the latter, a shaft extending in a substantially horizontal direction above the rear wheel of the bicycle on which shaft said motor-wheel is journaled, a support for said shaft, a pinion on said shaft, the shaft being adapted to be turned a fourth of a revolution in a plane at right angles to the plane of its working rotation to throw the motor out of engagement with the wheel driven thereby, and to be turned a half a revolution to bring the opposite side of the motor-wheel into engagement with the wheel of the bicycle, and a manually-operated rack for engaging said pinion to turn said shaft.

4. A bicycle attachment comprising a motor-wheel in engagement with the rear wheel of the bicycle, a spring within said motor-wheel adapted to be wound up by the same and arranged to drive the latter, a shaft on which the wheel is journaled, a support on the bicycle for carrying said shaft, said shaft being adapted to be turned a fourth of a revolution in a plane at right angles to the plane of its working rotation to throw the motor out of engagement with the wheel driven thereby and to be turned a half-revolution to bring the opposite side of the motor-wheel into engagement with the wheel of the bicycle, and manually-controlled means for turning said shaft.

5. A bicycle attachment comprising a wheel, a spring adapted to be wound up by the said wheel and arranged to drive the latter, a shaft having a fork in which the wheel is journaled, a pinion on said shaft, a support on the bicycle, provided with a guideway, a slide in the said guideway, in which the shaft is journaled, and a manually-controlled segment engaging the pinion on the said shaft, for turning the latter, as set forth.

6. A bicycle attachment comprising a wheel, a spring adapted to be wound up by the said wheel and arranged to drive the latter, a shaft having a fork in which the wheel is journaled, a pinion on said shaft, a support on the bicycle, provided with a guideway, a slide in the said guideway, in which the shaft is journaled, and a manually-controlled segment engaging the pinion on the said shaft, for turning the latter, the said segment having means for imparting an initial sliding motion to the shaft and the slide in which it is journaled, previous to turning the shaft, as set forth.

7. A bicycle attachment comprising a wheel, a spring adapted to be wound up by the said wheel and arranged to drive the latter, a shaft having a fork in which the wheel is journaled, a pinion on said shaft, a support on the bicycle, provided with a guideway, a slide in the said guideway, in which the shaft is journaled, a manually-controlled segment engaging the pinion on the said shaft, for turning the latter, the said segment having means for imparting an initial sliding motion to the shaft and the slide in which it is journaled, previous to turning the shaft, and a locking device for locking the said segment in a desired position, as set forth.

8. A bicycle attachment comprising a motor-wheel adapted to be brought into engagement with the rear wheel of the bicycle, and a spring within said motor-wheel adapted to be wound up by the same and arranged to drive the latter, a rotatable shaft on which said motor-wheel is supported, said shaft being disposed to bring its axis out of alinement with the radius of the bicycle-wheel, whereby to adapt it to be turned a fourth of a revolution to throw the motor out of engagement with the bicycle-wheel and to be turned a half-revolution to bring the opposite side of the motor-wheel into engagement with said wheel of the bicycle, to deliver its stored-up power thereupon to assist in propelling the same.

9. An attachment for wheeled vehicles, consisting of a motor arranged for frictional engagement with the rim of a wheel of the vehicle, for actuating the motor, to store power, the motor being adapted to be bodily turned a half-revolution for reëngaging its opposite side with the rotatable part, to drive the latter, the said motor having a reversible wheel, and a spring adapted to be wound up by the reversible wheel and arranged to unwind, to drive the reversible wheel when the latter is reversed and for holding the same in an intermediate inactive position, as set forth.

10. A bicycle provided at its rear fork with a supporting-plate having a guideway, a slide in the said guideway, a shaft journaled in the said slide and provided with a fork, a wheel journaled in the said fork, a spring in the wheel, having one end fastened to the wheel-rim and the other to the wheel-shaft, and means for reversing the said shaft, as set forth.

11. A bicycle provided at its rear fork with a supporting-plate having a guideway, a slide in the said guideway, a shaft journaled in the said slide and provided with a fork, a wheel journaled in the said fork, a spring in the wheel, having one end fastened to the wheel-rim and the other to the wheel-shaft, and means for reversing the said shaft, the said means comprising a pinion on the said shaft, a segment mounted to swing on the support and engaging the said pinion and cam-faces on the said segment, for engaging the said shaft, as set forth.

12. A bicycle provided at its rear fork with a supporting-plate having a guideway, a slide in the said guideway, a shaft journaled in the said slide and provided with a fork, a wheel journaled in the said fork, a spring in the wheel, having one end fastened to the wheel-rim and the other to the wheel-shaft, and means for reversing the said shaft, the said means comprising a pinion on the said shaft, a segment mounted to swing on the support and engaging the said pinion, cam-faces on the said segment, for engaging the said shaft, and an operating and locking device for the said segment, as set forth.

In testimony whereof I have signed my name to this specification in the presence of two subscribing witnesses.

BRUCE REAVES PEPPER.

Witnesses:
   J. E. EVERETT,
   B. F. ALFORD.